United States Patent [19]

Gugg

[11] Patent Number: 5,326,310
[45] Date of Patent: Jul. 5, 1994

[54] DE-RINDING DEVICE FOR PORK

[76] Inventor: Anton Gugg, Herzog-Odilo-Str. 19, A-5310 Mondsee, Austria

[21] Appl. No.: 959,220

[22] Filed: Oct. 9, 1992

[51] Int. Cl.⁵ .............................................. A22B 5/16
[52] U.S. Cl. ..................................... 452/133; 452/127
[58] Field of Search ............... 452/133, 132, 127, 125, 452/136; 30/276

[56] References Cited

U.S. PATENT DOCUMENTS

| | | | |
|---|---|---|---|
| 2,914,795 | 12/1959 | Lindstrom et al. | 452/133 |
| 3,207,197 | 9/1965 | Wilcox | 146/203 |
| 4,327,633 | 5/1982 | Leining et al. | 452/127 |
| 4,631,780 | 12/1986 | Leining | 452/133 |
| 4,858,321 | 8/1989 | McCullough | 30/276 |
| 4,993,112 | 2/1991 | Burnett et al. | 452/133 |

*Primary Examiner*—Willis Little
*Attorney, Agent, or Firm*—Cort Flint

[57] ABSTRACT

The invention relates to a de-rinding device for pork having a de-rinding knife (7) at one free end and, at a distance from same corresponding to the rind thickness, a contact surface. As a relative movement is carried out between a meat area to be de-rinded and the knife passing with the contact surface, the rind (5) is separated. A drive unit (10) is provided for the knife. According to the invention the knife and the drive unit constitute a manual de-rinding device (3) which is portable in operation and is equipped with at least one handle (16) on a device housing (9). The de-rinding knife (3) is suitable to de-rind whole or half hogs in strips before cutting them into pieces, in particular in a suspended position. A simple, safe and low-cost de-rinding process is thus afforded.

19 Claims, 3 Drawing Sheets

DE-RINDING DEVICE FOR PORK

BACKGROUND OF THE INVENTION

The present invention relates to a device for de-rinding pork.

Removing rind (de-rinding) is normally done manually with a knife or is carried out by means of a device with a cutting element equipped with a drive unit. A de-rinding knife is provided at one free end and a contact surface is provided at a distance equal to the thickness of the rind. When a relative movement takes place between a meaty zone from which rind is to be stripped and the cutting element with the passing contact surface, the rind is stripped off.

A known de-rinding device for pork is made as a standing device. It is provided with a horizontal working surface approximately 50 cm wide on which the hog parts which were previously cut into appropriate sized pieces are laid by a standing operator. A driven draw-in roller with teeth distributed over the circumference is placed horizontally in front of a horizontal, fixed de-rinding knife. To remove the rind, the operator presses down one end of the piece of meat from the top on the draw-in roller. The draw-in roller pushes the piece forward to the knife and the rind is separated from the meat. A receiving container is located below the cutting element and receives the detached rind. The piece of meat, stripped of its rind, is removed at the top by the operator.

With this process the danger of injury is considerable since the hands of the operator are within range of the cutting element and the draw-in roller which has teeth. De-rinding, especially as applied to pork parts, and their removal requires a great amount of attention and care. The fact that the design only allows for pork parts of maximum 50 cm width to be processed represents another disadvantage. Therefore de-rinding from whole or half hogs such as they are supplied by the slaughterhouse is not possible. Since the hogs must be scalded, shaved and divided into smaller parts before further processing, the operation is costly in time and money. Cost disadvantages are furthermore produced through the fact that a certain amount of working space must be provided for a standing device. Since a standing device must be heavy and must be securely anchored for reasons of stability, the investment costs for such a de-rinding accessory is correspondingly high.

Accordingly, an object of the present invention is to create a de-rinding device which lowers the cost of the de-rinding process.

Another object of the present invention is to provide a device for removing rind from hogs which is portable and safe to use.

SUMMARY OF THE INVENTION

The above objectives are accomplished according to the present invention by providing a de-rinding device having the cutting element and drive unit provide a cutting element and a drive unit constitute an easily manually-operated de-rinding device with at least one handle on a device housing, e.g. a carrying frame in a device housing. The de-rinding knife extends approximately transversely and its cutting edge vertically in relation to the user position dictated by the position of the handle.

The de-rinding device is suitable for the removal of rind in strips from whole or half hogs before they are cut into pieces, in particular in a suspended position. For this purpose the de-rinding device is guided by hand with the knife part in contact with and along the outside of the hog. The de-rinding knife strips off the width of the thus produced de-rinding strip. This process can be carried out at will in all directions. It is however advantageous for the device to be moved pursuant to gravity in a descending motion, especially when processing suspended hogs or hog halves. To remove the rind it is not necessary to cut the hogs into pieces since all the parts of the hog can be worked with the manual device.

Before hogs are cut into pieces it is normally necessary to scald them, to remove the bristles and to shave them. These steps can now be omitted since the hog rinds are separated from the meaty parts of the hog together with the bristles by means of the manual de-rinding device and can be disposed of as worthless waste. The rinds may be removed from the animals already in the slaughterhouse after slaughtering the animals without preparatory work. The rinds may be supplied for further processing, thus reducing labor costs for the downstream processor.

When the portable manual de-rinding device may be advantageously used in smaller butchering plants, restaurants, and for personal slaughtering operations. It offers on the one hand the advantage of low outlay in labor and working time since de-rinding is generally done manually in these cases. On the other hand, and contrary to a fixed de-rinding device, no working area is permanently occupied since the manual device is portable and can be used at different location of a meat processing plant. A permanent location is thus not necessary.

The purchase price of the manual device is furthermore much lower than for a standing device, since the standing device is more costly in its construction due to design imperatives.

A further advantage results when extremely lean hogs are being processed. In this case the lard layer should remain on the meat part. This can only be achieved with difficulty and without precision when removing the rind manually with a knife. The manual device makes it possible to remove skin with precision in function of rind thickness so that the meaty part yields a higher price because of higher weight.

The fact that hands are not brought into proximity of the knife and of the draw-in roller, as is required with a standing machine, contributes to the safety of operating personnel. Also, the handling of a knife when manual de-rinding is carried out involves a greater risk of injury than the operation of a manual device according to the instant invention.

The present invention proposes that an additional width-separating knife of a cutting width at least between the de-rinding knife and the application surface be installed at both ends of the de-rinding knife and at a right angle thereto. This affords the advantage that precisely delimited rind strips are cut out and a connection at their lateral edges is also severed. The manual device can be guided during the de-rinding process precisely thanks to the lateral width-separating knives and the cutting process is facilitated by the additional knives.

The cutting element projects advantageously from a face of the device housing, and across from it. Two handles placed near the back at a distance from each other are connected to the device handle or the carrying frame in the device housing. As both hands are used, good and precise guidance of the manual device is achieved. The fact that both hands are holding the device and cannot come into contact with the cutting knife further contributes to safety. As an alternative it is possible to use a holding hoop surrounding part of the device housing, instead of two handles.

Preferably, an electric motor capable of being controlled by two switches, installed on a handle is be used as the drive unit. This affords further protection against cutting injuries to the hands, since the device can only be started with both hands on the handles. Reaching into the knife part of the device is prevented.

The switch can also be designed advantageously for continuous adjustment of a potentiometer of a speed control of the drive unit, similar to those designed for drilling machines. This makes it possible to adapt the cutting speed precisely to the parts of the hog being worked on. A known helicoidal-shaft drive offers yet another alternative drive possibility.

The de-rinding knife has a width of approx. 15 to 25 cm. The knife width substantially determines the size and the weight of the drive. The overall size and overall weight of the device is therefore determined by the knife width. With a knife width of 15 to 25 cm the optimal weight for proper handling and a practical device size are achieved. Furthermore, the concave as well as convex surface curves of the hog's body can be worked on precisely with this knife width in the de-rinding process. This results in good performance of the manual device.

Preferably, the cutting element consists of a fixed de-rinding knife and an draw-in roller with teeth distributed over the circumference. The draw-in roller is here placed directly in front of the knife edge and at a distance from it and constitutes the contact surface. The direction of rotation of the draw-in roller causes the rind to be pulled in the direction of the knife. This has the advantage that the pulling action is produced automatically by the roller. Less force is expended to actuate the manual device. The device merely needs to be brought into surface contact with the surface of the hog and can then be guided precisely in any desired direction. The distance between the draw-in roller and the knife edge can advantageously be adjusted. This makes it possible to adapt the device to different rind thicknesses.

Advantageously, the draw-in roller is mounted elastically. This affords automatic adaptation, within certain limits, of different rind thicknesses to curves in the form of the hog's body in the course of the cutting operation. Handling of the device is thus facilitated and improved.

Fixed strippers are installed near the circumference of the draw-in roller to clean the teeth. The draw-in roller is constantly cleaned of possibly remaining rind and lard particles which could hinder the moving of the parts to be stripped of rind or skinned. Possible interference with the draw-in process are thus prevented.

Preferably, the de-rinding knife consists of a first, fixed knife element, preferably with cylindrical grinding, and a second knife element, preferably with cylindrical grinding, at a small distance from the first knife. The second knife is connected to the drive unit over a cam so that knife element edges of both knife elements can be moved in a relative longitudinal motion to each other. This is an alternate embodiment of the manual device with draw-in roller as described above. The same favorable results in de-rinding are achieved with this device.

In an advantageous embodiment, the width-separating knives are also connected to the drive unit and are preferably made in form of driven cutting wheels. This affords the advantage that the energy expenditure is decreased, as the drive cutting wheels automatically cut out the lateral edges of the rind strip.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
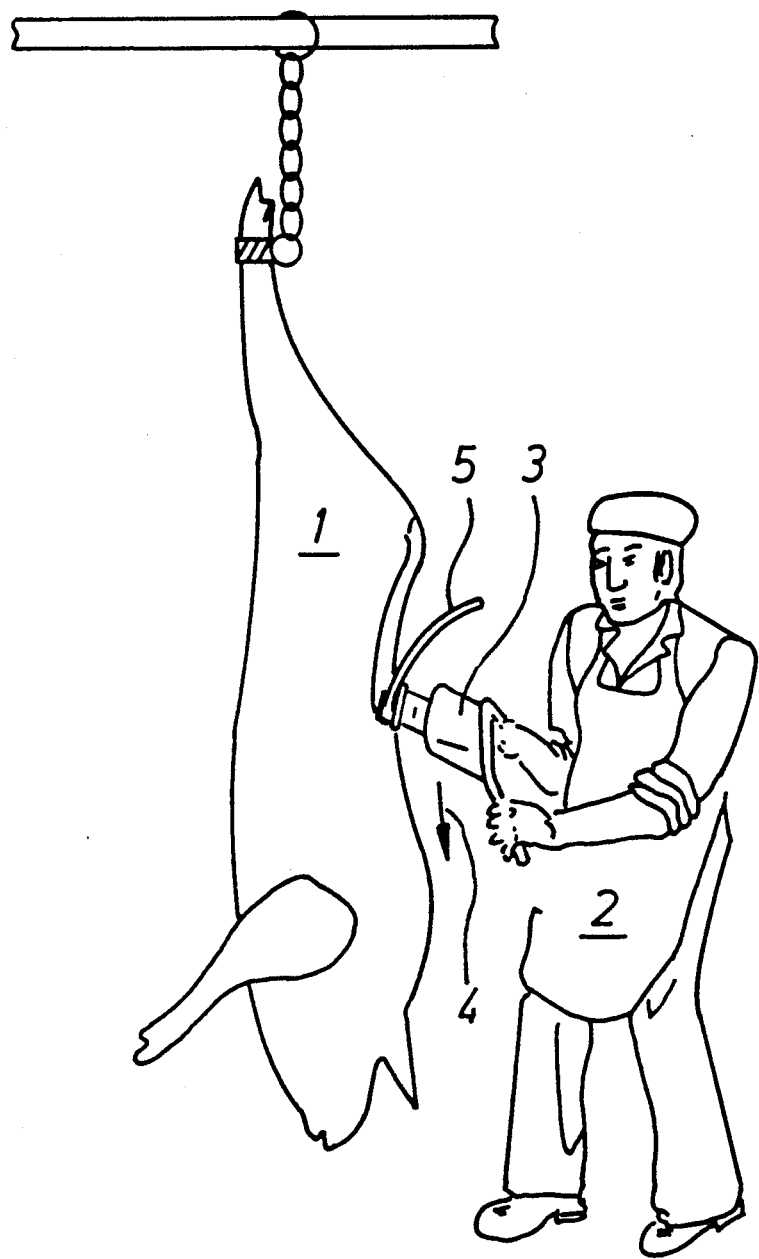
FIG. 1 illustrates the de-rinding process with a de-rinding device according to the invention as applied to a suspended hog.

Referring now in more detail to the drawings, FIG. 1 shows a de-rinding operation on a hog 1 suspended by its rear legs, and a standing operator 2 manually operating a de-rinding device 3 according to the invention.

Figure 2:
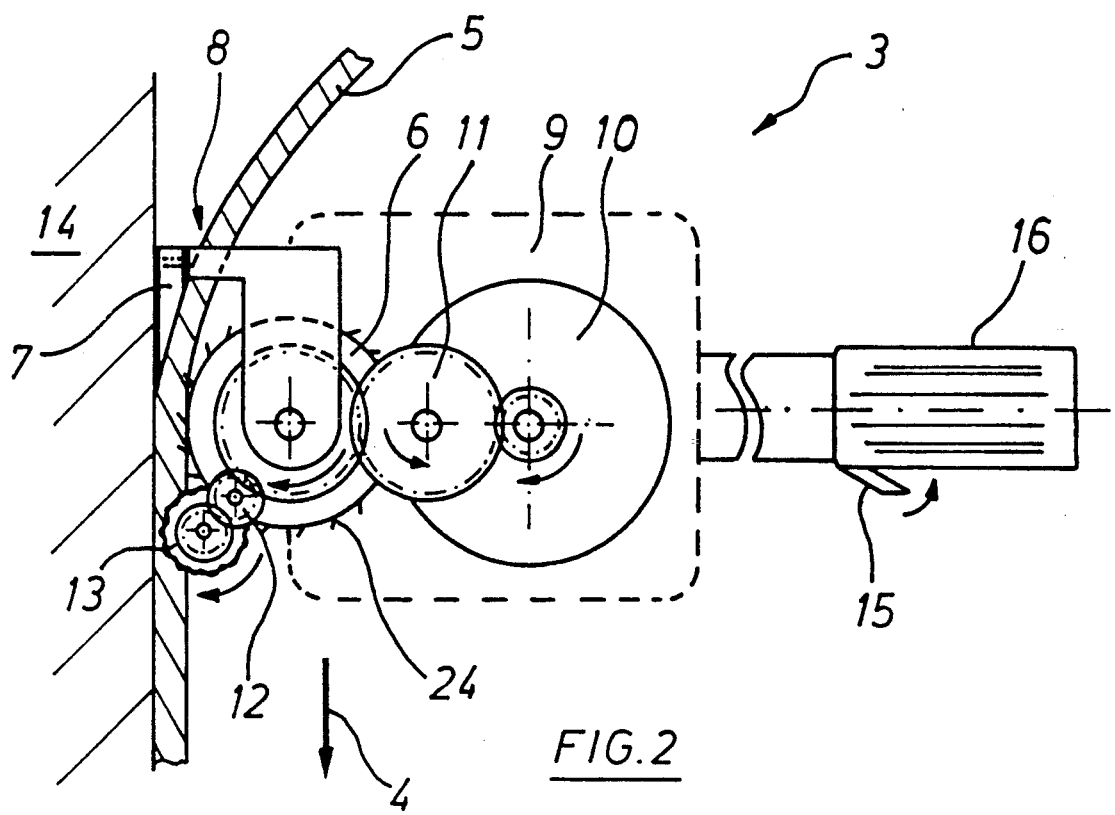
FIG. 2 illustrates a side view of a de-rinding device with draw-in roller according to the invention.

FIG. 2 shows de-rinding device 3 with a draw-in roller 6. A de-rinding knife 7 separates the rind strip 5 from the meat part 14 as a downward movement 4 is carried out. The de-rinding knife 7 is attached to the front of the de-rinding device 3 and is replaceable. A gap exists between the de-rinding knife 7 and the draw-in roller 6. The rind strip 5 is able to emerge through this gap toward the top.

An electric motor 10 which drives the draw-in roller 6 via a transmission gear 11 is located in a housing 9. The draw-in roller is equipped with teeth 24 distributed over its circumference to dig into the hog rind. Width-separating knives 13 located on both sides are driven via an additional gear 12. These width-separating knives 13 are made in form of cutting wheels providing cylindrical grinding and rotating cutting through the edges of the rind strips down to the meat part 14.

Figure 3:
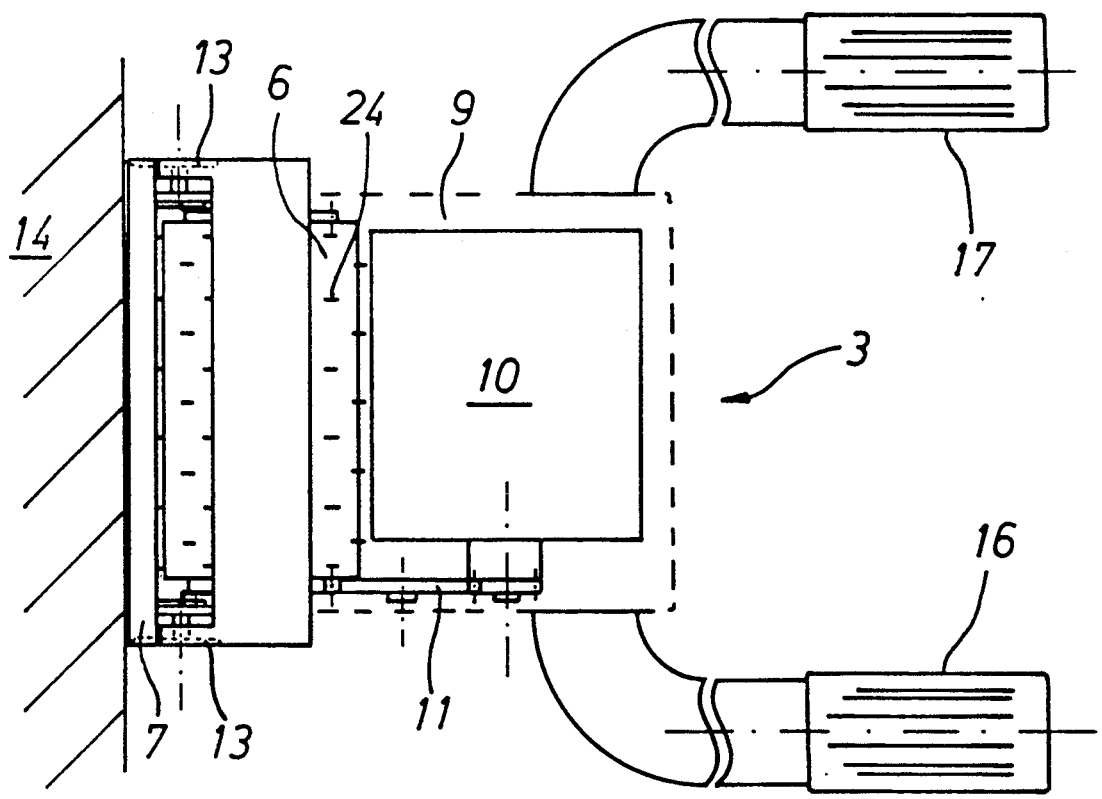
FIG. 3 illustrates a top view of a de-rinding device with draw-in roller according to the invention.

The drive is started up by a switch 15 on handle 16 (and possibly by a second electrically parallel switch on the second handle). As the top-view in FIG. 3 shows, two handles 16 and 17 extend to the rear at the back of the device.

Figure 4:
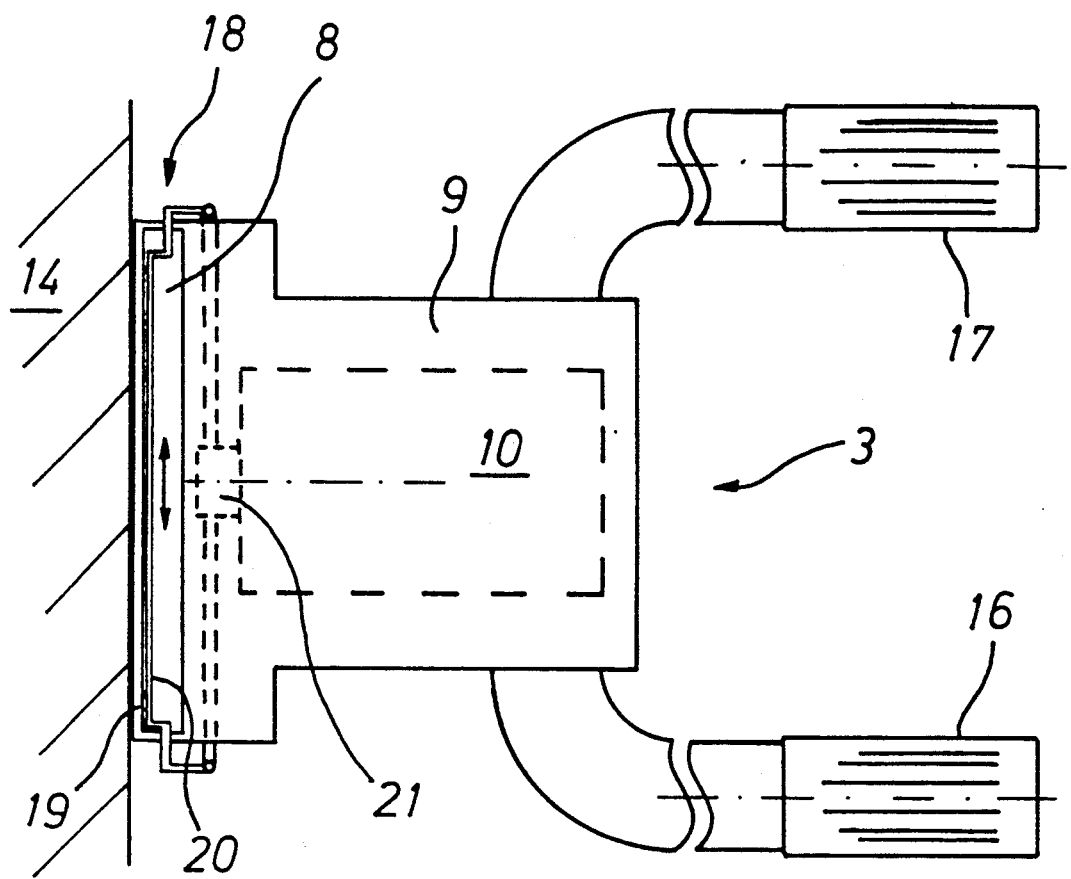
FIG. 4 illustrates a top view of an alternative embodiment of a de-rinding device according to the invention.

FIG. 4 shows a top view of an alternative embodiment. The cutting element 18 consists of a first, fixed knife element 19 and of a second knife element 20 at short distance from the first knife element. The second knife 20 is moved back and forth in longitudinal direction by electric motor 10 over a gear with cam 21.

Figure 5:
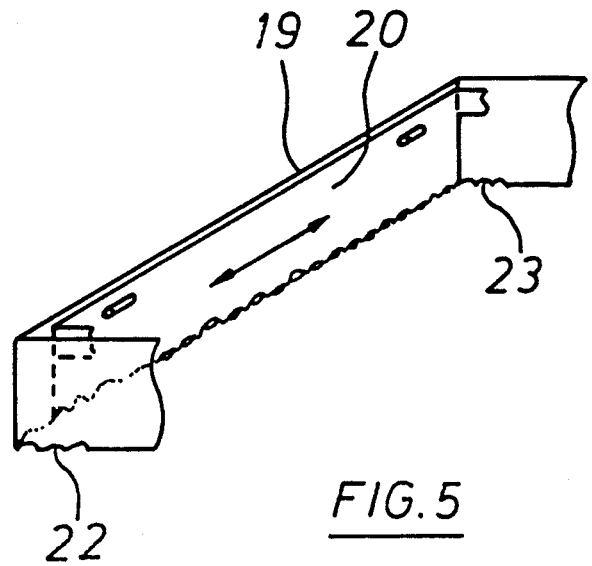
FIG. 5 illustrates a driven cutting element of the de-rinding device of FIG. 4 according to the invention.

FIG. 5 shows the two knife elements 19 and 20 with reciprocating cutting. It can be seen that the two ends 22 and 23 of the fixed knife, bent at a right angle, are designed to be width-cutting knives.

In conclusion it is found that a de-rinding operation can be carried out easily, inexpensively and safely with the de-rinding device according to the invention.

While a preferred embodiment of the invention has been described using specific terms, such description is for illustrative purposes only, and it is to be understood that changes and variations may be made without departing from the spirit or scope of the following claims.

What is claimed is:

1. A de-rinding device for pork having a de-rinding knife at a contact surface disposed at a distance from said de-rinding knife so that the rind is striped off in a relative movement of a meat area to be de-rinded passing between said de-rinding knife and said contact surface, and a drive unit, wherein said device comprises:
    a de-rinding knife and a drive unit for said knife;
    a portable carrying frame having at least one handle; said de-rinding knife and drive unit being carried by said frame approximately transverse to said handle and having a cutting edge disposed vertically in relation to the position of the user as determined by the position of the handle so that the de-rinding device removes the rind from a whole or half hog, in a suspended position; said frame being guided by hand whereby the de-rinding knife is part in contact with the outside of the hog, said de-rinding knife cuts off the broad side of a rind strip being removed.

2. The device of claim 1 including additional width-cutting knives disposed on both end sides of said de-rinding knife having a cutting depth at least equal to the distance between said de-rinding knife and said contact surface so that said width-cutting knives cut off the longitudinal edges of the rind strip.

3. The device of claim 1 including two handles connected to the back of said frame on the opposing side of said de-rinding knife which extend from the front of said frame.

4. The device of claim 33 wherein said drive unit includes an electric motor controlled by two switches electrically connected in series, each of which is installed on one of said handles.

5. The device of claim 1 wherein said de-rinding knife has a knife width of approximately 15 to 25 cm.

6. The device of claim 1 wherein said de-rinding knife is fixed, and including a draw-in roller with teeth distributed over its circumference driven by said drive unit said draw-in roller being disposed directly in front of a knife edge of said de-rinding knife and at a distance which is a function of the rind thickness, so that said draw-in roller constitutes said contact surface.

7. The device of claim 6, including means for adjusting the distance of the draw-in roller from said knife edge.

8. The device of claim 6 wherein the draw-in roller is elastically mounted on said frame.

9. The device of claim 6 including fixed strippers for the cleaning of the teeth installed near the circumference of the draw-in roller.

10. The device of claim 1 wherein said de-rinding knife consists of a first, fixed knife element, and a second knife element disposed at a short distance from the first knife, and said second knife element is connected to said drive unit via a gear with a cam so that said two knives can be moved longitudinally in relation to each other.

11. The device of claim 2 wherein said width-separating knives are connected to said drive unit and are preferably made in form of driven cutting knives.

12. A portable de-rinding device for pork comprising:
    a de-rinding knife having a cutting edge;
    a contact surface disposed at a predetermined distance from said cutting edge so that the rind is stripped off in a relative movement of a meat area to be de-rinded passing between said knife and said contact surface;
    a drive unit for driving said knife;
    a portable frame having at least one handle for carrying said de-rinding knife element and drive unit so that said cutting edge is generally transverse to the position of the user so that the de-rinding device removes the rind from a whole or half hog, in a suspended position, as it is guided by hand; and
    width-cutting knives disposed on both end side of said de-rinding knife having a cutting depth at least generally equal to the distance between said de-rinding knife and said contact surface so that said width-cutting knives cut off the longitudinal edges of the rind strip.

13. The device of claim 12 including two handles connected to the back of said frame on the opposing side of said knife element which extend from the front of said frame.

14. The device of claim 13 wherein said drive unit includes an electric motor controlled by two switches electrically connected in series, each of which is installed on one of said handles.

15. The device of claim 12 wherein said de-rinding knife has a knife width of approximately 15 to 25 cm.

16. The device of claim 12 wherein said knife element includes a fixed de-rinding knife and a draw-in roller with teeth distributed over its circumference driven by said drive unit said draw-in roller being disposed directly in front of said knife edge and at a distance which is a function of the rind thickness, so that said draw-in roller constitutes said contact surface.

17. The device of claim 16, including means for adjusting the distance of the draw-in roller from the cutting knife edge.

18. The device of claim 12 wherein said knife consists of a first, fixed knife, and a second knife disposed at a short distance from the first knife, and said second knife is connected to said drive unit via means which allows adjustment so that said cutting edge of the two knives can be moved longitudinally in relation to each other.

19. The device of claim 12 wherein said width-separating knives are connected to said drive unit and are preferably made in form of driven cutting knives.

* * * * *